United States Patent
Zschoche

(10) Patent No.: US 6,711,877 B2
(45) Date of Patent: Mar. 30, 2004

(54) FOOD PRODUCT HANDLING MACHINE

(75) Inventor: Robert A. Zschoche, Astoria, OR (US)

(73) Assignee: Carruthers Equipment Co., Warrenton, OR (US)

( * ) Notice: Subject to any disclaimer, the term of this patent is extended or adjusted under 35 U.S.C. 154(b) by 112 days.

(21) Appl. No.: 10/067,612

(22) Filed: Feb. 4, 2002

(65) Prior Publication Data

US 2003/0172617 A1 Sep. 18, 2003

(51) Int. Cl.$^7$ .............................. B65B 1/00; B65G 25/00
(52) U.S. Cl. ....................... 53/250; 141/167; 198/465.2
(58) Field of Search ................... 53/249–253; 141/167, 141/180; 198/465.1, 465.2

(56) References Cited

U.S. PATENT DOCUMENTS

| | | | | | |
|---|---|---|---|---|---|
| 1,926,914 A | * | 9/1933 | Popov | | 198/465.2 |
| 2,331,540 A | * | 10/1943 | Dilling | | 198/465.2 |
| 3,014,321 A | * | 12/1961 | Lesch | | 198/465.1 |
| 3,595,368 A | * | 7/1971 | Mantovani | | 198/465.2 |
| 3,756,373 A | * | 9/1973 | Pettis et al. | | 198/465.1 |
| 3,991,685 A | * | 11/1976 | Toby | | 198/465.2 |
| 4,710,122 A | * | 12/1987 | Villanueva | | 198/465.2 |
| 4,823,539 A | * | 4/1989 | Kuckhermann et al. | | 198/465.2 |
| 4,974,391 A | * | 12/1990 | Blum et al. | | 53/250 |
| 5,041,297 A | * | 8/1991 | Dowaliby | | 53/529 |
| 5,350,052 A | * | 9/1994 | Gebald et al. | | 198/465.2 |
| 5,401,156 A | * | 3/1995 | Anderson | | 53/529 |
| 5,570,562 A | * | 11/1996 | Anderson | | 53/250 |
| 5,605,218 A | * | 2/1997 | von Froreich | | 198/465.2 |
| 6,305,527 B1 | * | 10/2001 | Bungter | | 198/465.2 |
| 6,499,274 B1 | * | 12/2002 | McDonald et al. | | 198/465.1 |

* cited by examiner

Primary Examiner—Stephen F. Gerrity
(74) Attorney, Agent, or Firm—Robert L. Harrington; Schwabe Williamson & Wyatt

(57) ABSTRACT

A pocket conveyor for use in food processing in which the pockets move independently from each other. Each pocket contains a portion of food which is conveyed from one processing machine to another in the course of food production. Independent movement of the pockets provides for, among other things, greater efficiencies in food production by allowing independent operation of the various processing machines along the conveyor as well as allowing the use of multiple processing machines for each of one or more processes. Further, independent movement of the pockets eliminates the maintenance issues associated with pockets which are chain-linked, such as chain and motor related failure.

21 Claims, 10 Drawing Sheets

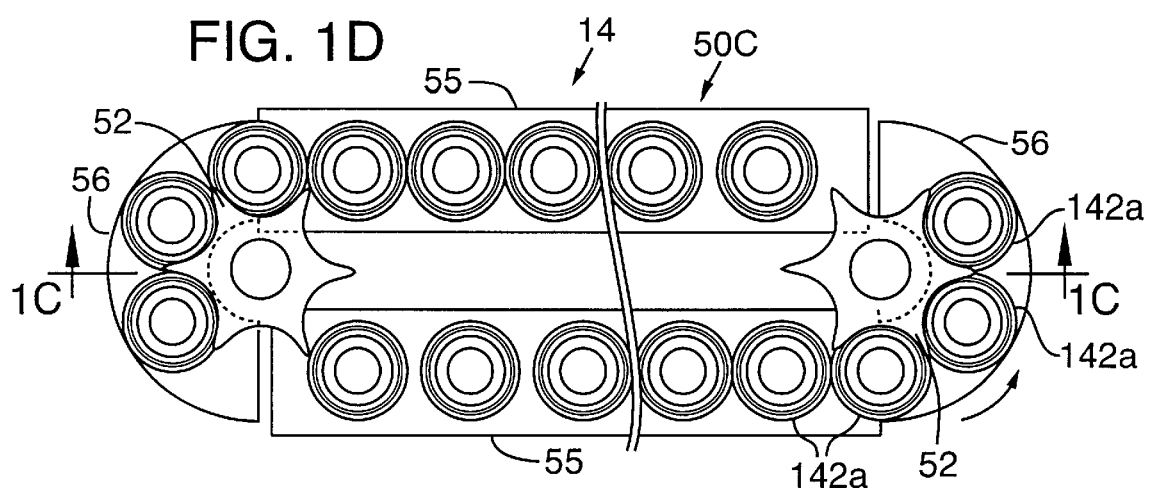

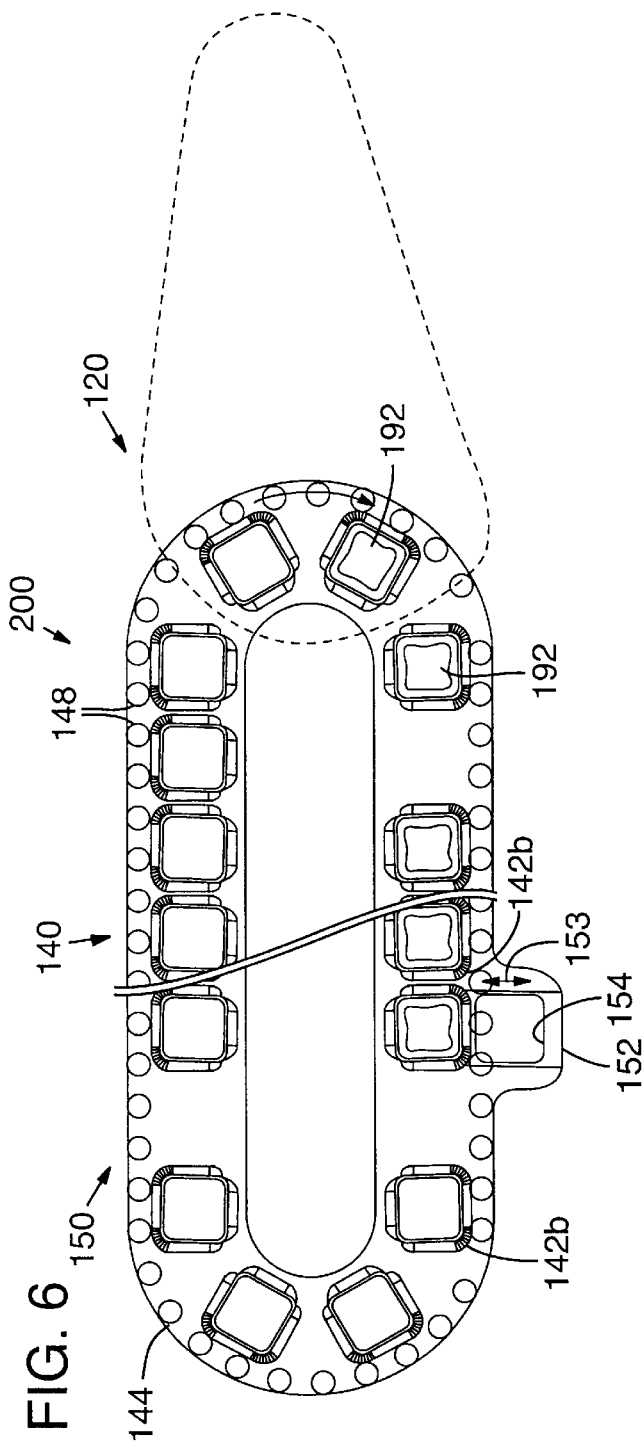
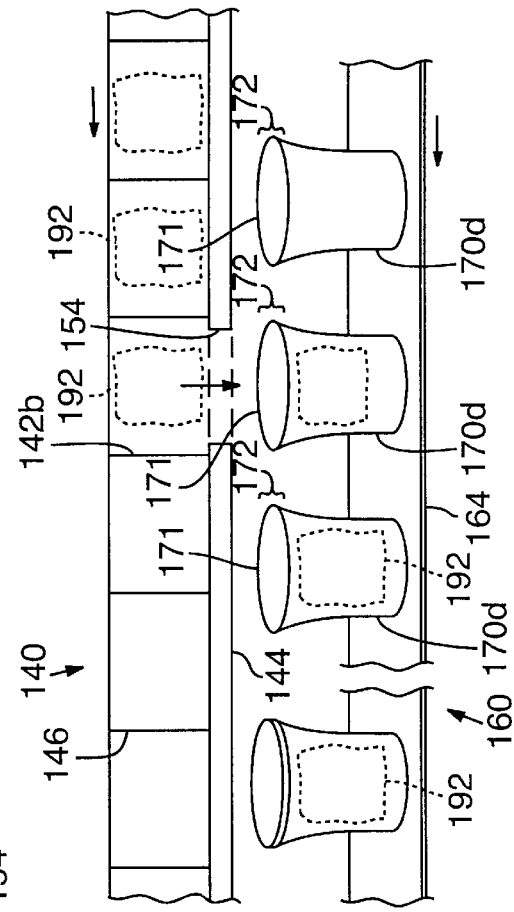
FIG. 6
FIG. 7

6,711,877 B2

FOOD PRODUCT HANDLING MACHINE

FIELD OF THE INVENTION

This invention relates to food handling machines and more particularly, to machines that convey food portions between various food processing machines.

BACKGROUND OF INVENTION

In modern food production, the food product undergoes a number of processes in a complex system of food processing machinery to transform the raw product into a finished product suitable for packaging. This food processing machinery may include, among others, food preparation, portioning, and packaging machines as well as the machinery required to convey the food product from one processing machine to another.

A conveyor system commonly found in the production of food product that is of a solid or semi-solid form is the pocket conveyor. Pocket conveyors consist of a number of linked-together pockets that are transported from one machine to another. Each pocket receives a food portion at one machine and conveys the food portion to a second machine. The linked-together pockets are carried by a single lane conveyor, driven by a drive chain, in a continuous circuit between a first machine and a second machine and back again to the first machine. The chain, or in other designs, the linked-together pockets themselves, is coupled between a drive sprocket and an idler sprocket where the drive sprocket is driven by a motor.

Pocket conveyors are frequently used between a machine that portions the food product into portions suitable for packaging and a machine that packages the food portion into containers. The chained or linked-together pockets travel in a continuous circuit between the portioning machine and the packaging machine. Machines of this type require that the chain of pockets be incrementally stopped for each pocket at the portioning machine in order for a pocket to receive a portion of food. The chain is restarted and incrementally stopped again at the packaging machine to present the portion of food to the packaging machine. The starting and stopping movement of the chain is not conducive to efficient processing or reliable machinery. Further, throughput speed is hindered by the slowest component of the food processing machinery, commonly, but not always, the portioning machine.

Additionally, there are mechanical constraints and maintenance issues related to pockets being coupled to a chain or being linked together. Chains require lubrication and are prone to jamming and failure because of there multi-part components. Pockets coupled together with links have similar issues as chain, and also can make pocket change-out more labor intensive.

There is a need for a pocket conveyor wherein the pockets are not chained or linked together resulting in a more reliable food processing machine. Further, there is a need for a pocket conveyor wherein the processing speed of one processing machine does not effect the processing speed of other processing machines along the food processing line. Additionally, there is a need for a pocket conveyor to provide for multiple conveying paths to service multiple processing machines. The present invention fulfills these needs.

SUMMARY OF INVENTION

One embodiment of the present invention provides a pocket conveyor for use in food processing in which the transfer pockets move independently from each other. Each transfer pocket contains a portion of food which is conveyed from one processing machine to another in the course of food production. Independent movement of the transfer pockets provides for, among other things, greater efficiencies in food production by allowing independent operation of the various processing machines along the pocket conveyor as well as allowing the use of multiple processing machines for each of one or more processes. Further, independent movement of the transfer pockets eliminates the maintenance issues associated with transfer pockets which are chain-linked, such as chain and motor related failure.

The transfer pockets are conveyed from one location to another by any one or combination of conveying means. In one embodiment, the transfer pockets are carried by one or more continuously moving belts which provide mobility to the transfer pockets as well as moving freely beneath the transfer pockets as the transfer pockets are obstructed from moving, such as when the transfer pockets are receiving or discharging food portions or when waiting in queue for the same.

In another embodiment of a conveying means, the transfer pockets are pushed along the conveyor by one or more drive turrets. The teeth of the drive turrets entrain the transfer pockets and push the transfer pockets down-line as the drive turrets rotate. The transfer pockets remain in close proximity to each other but are not linked or chained together. The abutment of subsequent transfer pockets cause the transfer pockets to advance along a stationary track.

In another embodiment of the invention, the machine for conveying food portions from a portioning machine that prepares the food portions to a container handling machine that prepares containers to receive the food portions, comprises a plurality of transfer pockets and a conveyor, the conveyor adapted to convey each transfer pocket independently from another from the portioning machine to the container handling machine, the transfer machine arranged to present one or more transfer pockets to the food portioning machine to collect food portions, and the transfer machine arranged to present one or more transfer pockets containing food portions to the container handling machine for subsequent depositing of the food portions into food containers.

In another embodiment of the invention, the machine comprises a portioning machine, a transfer machine and container handling machine. The portioning machine processes bulk food product to form food portions of a determined size, shape, weight and consistency. The portioning machine deposits the food portions into individual transfer pockets of the transfer machine. The transfer machine is arranged to move the transfer pockets independently from the other transfer pockets from the portioning machine to the container handling machine along one or more transfer lanes. The transfer pockets are independent from each other allowing the portioning machine to operate independently from the container handling machine. The container handling machine presents an open container to the filled transfer pocket for transfer of the food portion into the food container.

The present invention provides for a food handling machine that permits the various components of the machine, such as the portioning machine and the filling machine, to operate at their own speed, independent from each other, providing greatly increased processing speed through the food handling machine. The present invention also provides a food handling machine that permits the use of multiple processing machines, such as multiple container filling machines, to operate with one or more machines, such as a portioning machine. The increased speed of one type of machine is thus optimized as it handles the transfer pockets independently from a slower machine. The present invention is compatible with many variations of tray, pouch, and can filling machines in both speed fluctuations and container spacing.

BRIEF DESCRIPTION OF DRAWINGS

FIG. 1D is a top view of another embodiment of a pocket conveyor in accordance with the invention;

FIG. 6 is a view of the food processing machine of FIG. 5 as viewed on view lines 6—6;

FIG. 7 is a view of a portion of the machine of FIG. 5;

DESCRIPTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Figure 1A:
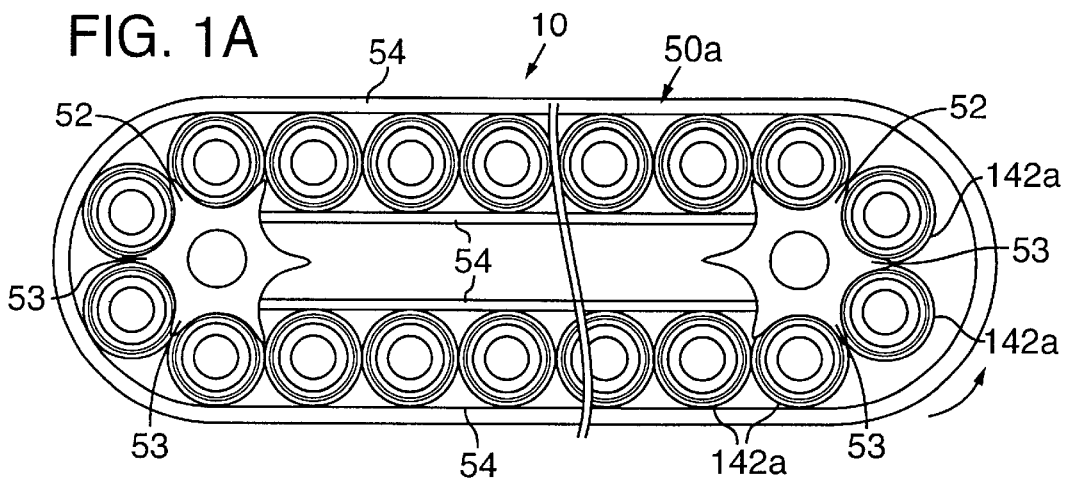
FIG. 1A is a top view of an embodiment of a pocket conveyor in accordance with the invention.

FIG. 1A illustrates a pocket conveyor 10 for use in food processing in accordance with one embodiment of the invention. The pocket conveyor 10 consists of a plurality of transfer pockets 142a and a conveyor 50a. The transfer pockets 142a are moved along the conveyor 50a from one location to another in a continuous circuit. The transfer pockets 142a are not coupled to each other, but are in close proximity or in touching relationship to each other.

The transfer pockets 142a comprise a topless and bottomless container which can be of any shape suitable for the particular purpose, such as, but not limited to, a box, cylinder, and octagon shape. The transfer pockets 142a as shown in FIG. 1A are in the shape of open-ended cylinders. Each transfer pocket 142a receives a portion of food from above and subsequent emptying of the food portion from below. The transfer pocket 142a supports the food portion during the conveying process. The transfer pocket 142a is supported from the bottom by the conveyor 50a to contain the food portion within.

The transfer pockets 142a are conveyed from one location to another by any one or combination of conveying means. In one embodiment as shown in FIG. 1A, the conveyor 50a comprises two drive turrets 52. The drive turrets 52 comprise a plurality of spaced-apart teeth 53. The space between adjacent teeth 53 conforms to the shape of the transfer pocket 142a. In operation, the turrets 52 rotate in the desired direction to push the transfer pockets 142a along the conveyor. As a transfer pocket 142a approaches one of the turrets 52, the transfer pocket 142a is entrained by the teeth 53 imparting forward movement to the transfer pocket 142a. As the transfer pocket 142a is advanced and released by the turret 52, the transfer pocket 142a abuts and pushes against the transfer pocket 142a before it, thereby pushing the transfer pockets 142a along the conveyor 50a. The conveyor 50a incorporates guard rails 54 to restrain the transfer pockets 142a to the desired path.

Figure 1B:
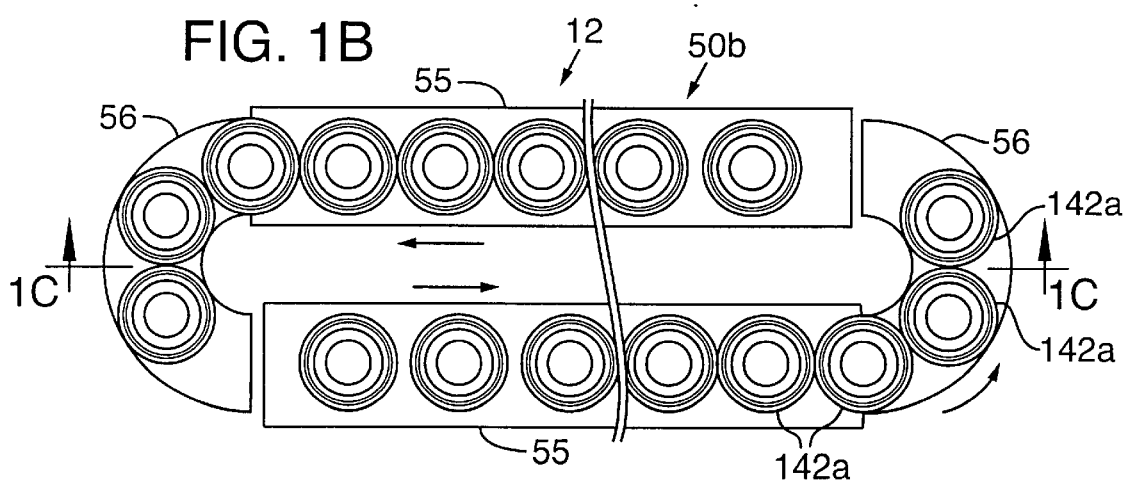
FIG. 1B is a top view of another embodiment of a pocket conveyor in accordance with the invention.
Figure 1C:
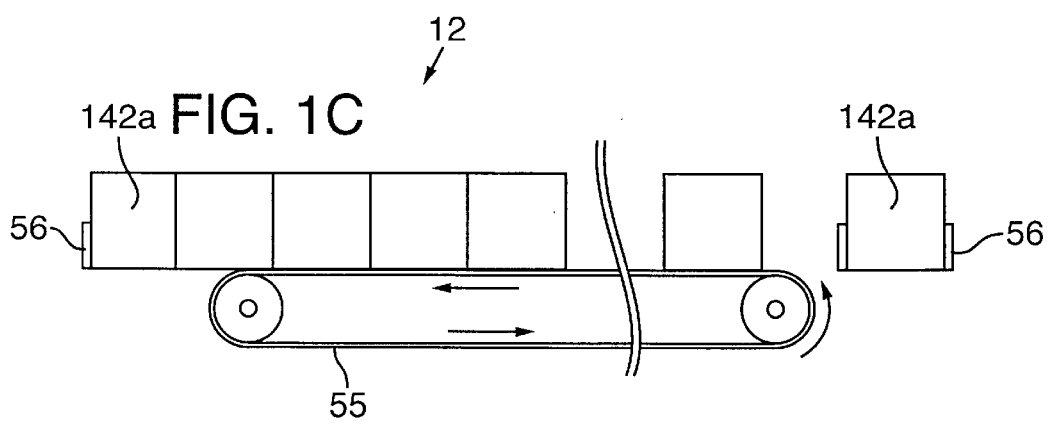
FIG. 1C is a side view of the embodiment of a pocket conveyor in accordance with FIG. 1B as viewed on view lines 1C—1C.

In another embodiment of the invention, as shown in FIGS. 1B–C, the pocket conveyor 12 comprises a conveyor 50b having two parallel but oppositely rotating belts 55, and two semi-circular end chutes 56. The transfer pockets 142a are carried in one direction by one belt 55, deposited on the end chute 56, and subsequently propelled along the chute 56, and carried back in the opposite direction by the second belt 55 to the origin. The transfer pockets 142a move along the chute 56 by any number of means, including, but not limited to, the momentum transferred by the belt 55 to the transfer pockets 142a, or from the impact of advancing transfer pockets 142a. The two belts 55 continuously move imparting forward mobility to the transfer pockets 142a. The belts 55 move freely beneath transfer pockets 142a that are held stationary, such as when the transfer pockets 142a are receiving or discharging food portions, or when waiting in queue for the same. The transfer pockets 142a are independent of each other; that is, there is no connection between each transfer pocket 142a. Therefore, each transfer pocket 142a can be processed independently from the processing of any other transfer pocket 142a.

In another embodiment of the invention, as shown in FIG. 1D, the pocket conveyor 14 comprises a conveyor 50c having two parallel but oppositely rotating belts 55, and two drive turrets 52. The transfer pockets 142a are advanced onto one of the belts 55 by the rotation of one of the drive turrets 52, carried in one direction by the belt 55, received and advanced by the second of the drive turrets 52, and carried back in the opposite direction by the second belt 55 to the origin. The two belts 55 continuously move imparting forward mobility to the transfer pockets 142a. The belts 55 move freely beneath transfer pockets 142a that are held stationary, such as when the transfer pockets 142a are receiving or discharging food portions, or when waiting in queue for the same. The transfer pockets 142a are independent of each other; that is, there is no connection between each transfer pocket 142a. Therefore, each transfer pocket 142a can be processed independently from the processing of any other transfer pocket 142a.

Figure 2A:
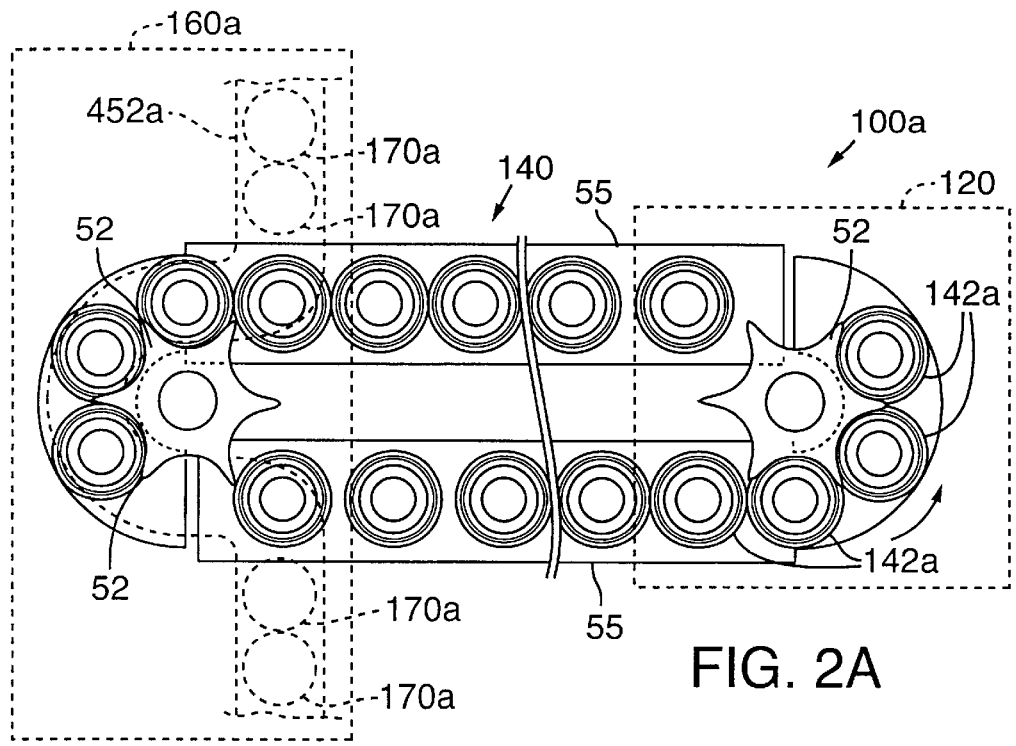
FIG. 2A is a view of an embodiment of the food processing machine in accordance with the invention.

FIG. 2A illustrates a portion of a food processing machine 100a in accordance with an embodiment of the invention wherein individual food portions are processed independently from each other. The machine 100a comprises a portioning machine 120, a transfer machine 140, and a container-handling machine 160a. The portioning machine 120 prepares food product into a food portion based on desired parameters, such as size, shape, weight, and consistency. The transfer machine 140 transports food portions between the portioning machine 120 and the container-handling machine 160a. The container-handling machine 160a receives the food portions from the transfer machine 140 for packaging into food containers 170a, such as pouches, jars, and cans.

The portioning machine 120 can be one of many types of machines suitable for preparing food portions to be presented to the transfer machine 140. Portioning machines 120 are known and used by those in the food processing industry. A portioning machine 120 can be used singularly or in combination with other portioning machines 120 to present the desired food portions to the transfer machine 140.

The container-handling machine 160a can be one of many types of machines suitable for accepting food portions from the transfer machine 140. Container-handling machines 160a are known and used by those in the food processing industry. The container-handling machine 160a can be used singularly or in combination with other container-handling machines 160a to accept the desired food portions from the transfer machine 140. The container-handling machine 160a presents empty containers 170a to the transfer machine 140 to be filled with the food portions, wherein the filled containers 170a are subsequently further processed, downline.

The transfer machine 140 comprises a plurality of transfer pockets 142a that transport food portions from the portioning machine 120 to the container-handling machine 160a. A food portion is deposited into a transfer pocket 142a and the transfer pocket 142a carries the food portion to the container-handling machine 160a.

The transfer pocket 142a can be of any number of shapes, sizes, and configurations, including open ended cylinders and boxes, as discussed below.

The transfer machine 140 comprises two parallel but oppositely rotating belts 55 and two drive turrets 52. The transfer pockets 142a are advanced onto one of the belts 55 by the rotation of one of the drive turrets 52, carried in one direction by the belt 55, received and advanced by the second of the drive turrets 52, and carried back in the opposite direction by the second belt 55 to the origin. The two belts 55 continuously move imparting forward mobility to the transfer pockets 142a. The belts 55 move freely beneath transfer pockets 142a that are held stationary, such as when the transfer pockets 142a are receiving or discharging food portions, or when waiting in queue for the same.

The function of the drive turrets 52 may be performed by a processing machine along the food processing machine 100a line. For example, the portioning machine 120 and/or the container-handling machine 160a can be of the type that comprises a transfer pocket drive mechanism, which would take the place of one of the drive turrets 52, that advances the transfer pockets 142a to the corresponding belts 55.

In the embodiment of FIG. 2A, in accordance with the present invention, the transfer pockets 142a are independent of each other; that is, there is no connection between each transfer pocket 142a. Therefore, each transfer pocket 142a can be processed independently from the processing of any other transfer pocket 142a. A transfer pocket 142a is filled by the portioning machine 120 and does not interfere with a second transfer pocket 142a being processed by the container-handling machine 160a. This provides the ability to independently control the portioning machine 120 and the container-handling machine 160a. Independent control is desired for processing efficiencies. Further, each component of the food processing machine 100a can be operated at optimal speeds independently from the other components.

The container-handling machine 160a provides the containers 170a on a continuously moving conveyance 452a. The transfer pockets 142a move into alignment with the containers 170a at the container-handling machine 160a during the filling operation. When the transfer pockets 142a are aligned with the containers 170a, the food portion is dropped through the bottom of the transfer pocket 142a into the container 170a below. The turret 52 indexes the transfer pockets 142a such that the transfer pockets 142a are positioned in proper alignment with the containers 170a. In this embodiment, the transfer pockets 142a and the containers 170a are in continuous movement.

Simultaneously with the filling of the containers 170a, other transfer pockets 142a are being filled with food portions by the portioning machine 120. The container-handling machine 160a will not be hindered by the portioning machine 120 as each transfer pocket 142a can move independently from the others. This is especially beneficial when the portioning machine 120 operates by stopping each transfer pocket 142a while depositing a food portion therein.

The transfer machine 140 provides the capability of using processing machines of different types and speeds. For example, one processing machine, such as the portioning machine 120 that operates most efficiently by holding the transfer pockets 142a stationary, can be used along the same processing line with another processing machine, such as the container-handling machine 160a that operates most efficiently in a continuously moving conveyance. The processing machines operate simultaneously and without interference. Independently movable transfer pockets 142a accommodate the operational aspects of the various components of the food processing machine 100a.

Figure 2B:
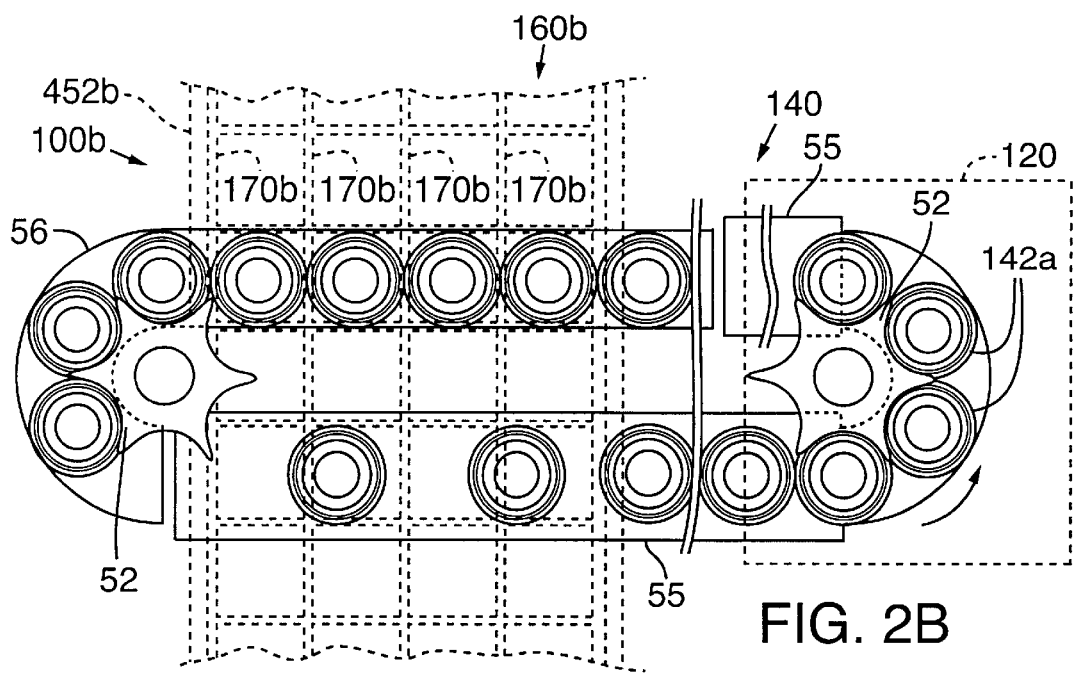
FIG. 2B is a view of another embodiment of the food processing machine in accordance with the invention.

FIG. 2B illustrates a food processing machine 100b in accordance with another embodiment of the invention. The embodiment of FIG. 2B is substantially similar to the embodiment of FIG. 2A but for the container-handling machine 452b and the method of depositing the food portions into the containers 170b. The food processing machine 100b enables multiple food portions to be deposited into multiple containers 170b simultaneously. A determined plurality of transfer pockets 142a are conveyed to and held in wait at the container-handling machine 160b during the filling operation.

A number of methods can be used to hold the awaiting transfer pockets 142a in proper alignment with the corresponding containers 170b held below include, but are not limited to, the following methods. In the embodiment shown in FIG. 2B, the physical dimensions of the transfer pockets 142a provide the proper spacing between food portions contained within the transfer pockets 142a when the transfer pockets 142a are in abutment with each other.

Figure 2C:
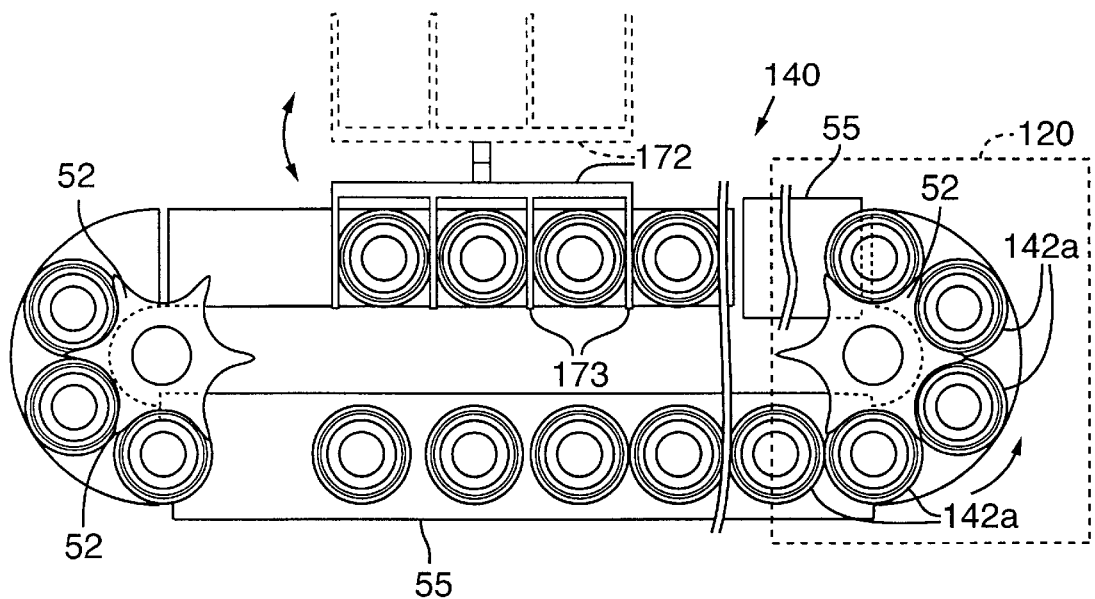
FIG. 2C is a view of an embodiment of the food processing machine in accordance with the invention.

In another embodiment in accordance with the invention shown in FIG. 2C, a comb 172 with multiple teeth 173 is used to position and hold the transfer pockets 142a stationary and in proper alignment. The comb 172 is positioned out of the path of the transfer pockets 142a to let the transfer pockets 142a move freely. The comb 172 is positioned into the path of the transfer pockets 142a and the teeth 173 are used to separate and position the transfer pockets 142a subsequent to releasing the food portion into the awaiting corresponding containers 107a held below.

Figure 2D:
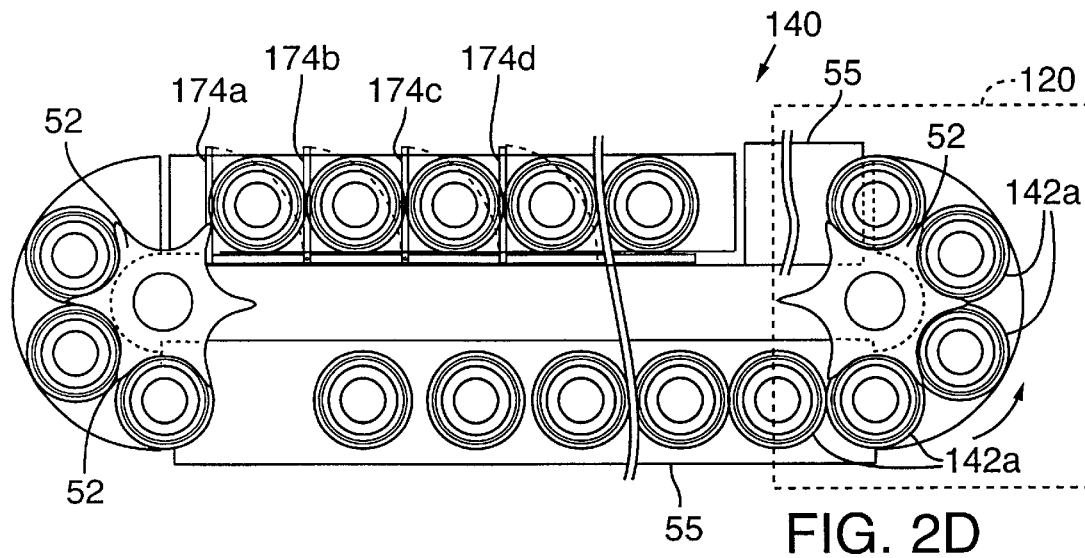
FIG. 2D is a view of another embodiment of the food processing machine in accordance with the invention.

In another embodiment in accordance with the invention shown in FIG. 2D, a plurality of swing gates 174a–d are used to position and hold the transfer pockets 142a stationary and in proper alignment. The gates 174a–d are positioned out of the path of the transfer pockets 142a to let the transfer pockets 142a move freely. Each gate 174a–d is positioned in sequence into the path of the transfer pockets 142a such that one transfer pocket 142a is held by each of the gates 174a–d. In the embodiment shown in FIG. 2D, the farthest down-stream gate 174a would close first, followed in sequences by each adjacent gate 142b–d. Sufficient spacing between each incoming transfer pocket 142a is required to allow the gates 174a–d to close between the transfer pockets 142a. This can be done, for example, by incorporating an upstream gate that meters the oncoming transfer pockets 142a in time with the gates 174a–d. The gates 174a–d separate and position the transfer pockets 142a subsequent to releasing the food portions into the awaiting corresponding containers 170a held below.

Simultaneously with the filling of the containers 170a, other transfer pockets 142a are being filled with food portions by the portioning machine 120. The container-handling machine 160a will not be hindered by the portioning machine 120 as each transfer pocket 142a can move independently from the others. This is especially beneficial when the portioning machine 120 operates by stopping each transfer pocket 142a while depositing a food portion therein.

Figure 3A:
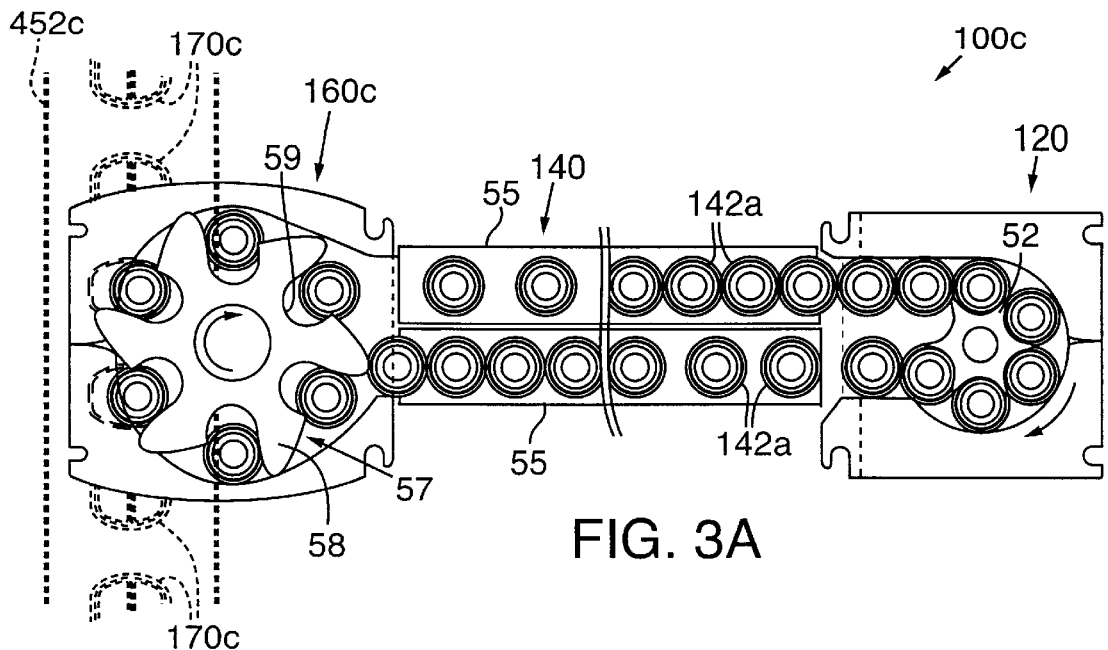
FIG. 3A is a view of another embodiment of the food processing machine in accordance with the invention.

FIG. 3A illustrates a food processing machine 100c in accordance with another embodiment of the invention. The food portions are deposited into containers 170c, such as trays, which are in continuous movement upon a common conveyance 452c. The transfer pockets 142a continuously move in alignment with the containers 170c at the container-handling machine 160c during the filling operation while other transfer pockets 142a are being individually processed to receive food portions at the portioning machine 120.

The embodiment of FIG. 3A shows a turret 57 that is able to convey transfer pockets 142 of various sizes to the container-handling machine 160c. The turret 57 comprises evenly spaced teeth 58 that define a containment space 59. The transfer pockets 142a are conveyed into proximity of the turret 57 by one of the rotating belts 55. The rotating belt 55 moves freely beneath transfer pockets 142a that are held waiting in queue for capture by the turret 57. Each transfer pocket 142a is captured within each of the containment spaces 59. The containment space 59 is shaped such that the turret 57 can convey and align transfer pockets 142a having a variety of shapes, for proper placement over the corresponding container. 170c. A second rotating belt 55 receives the emptied transfer pockets 142a for conveyance downline.

Figure 3B:
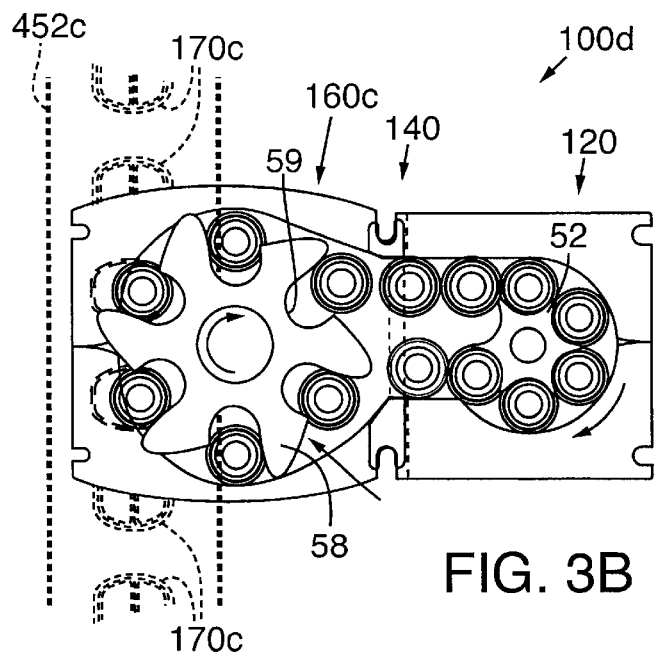
FIG. 3B is a view of another embodiment of the food processing machine in accordance with the invention.

FIG. 3B illustrates a food processing machine 100d in accordance with another embodiment of the invention. This embodiment is much like the embodiment of FIG. 3A, but does not include the rotating belts 55. The transfer pockets 142a are not coupled to each other, but are in close proximity or in touching relationship to each other. As the turret 57 rotates in the desired direction, the transfer pocket 142a is entrained by the teeth 53 imparting forward movement to the transfer pocket 142a. As the transfer pocket 142a is advanced and released by the turret 57, the transfer pocket 142a abuts and pushes against the transfer pocket 142a before it, thereby advancing the transfer pockets 142a, in similar fashion as the embodiment of FIG. 1A. The turret 52 can passively rotate in response to the passing transfer pockets 142a to guide the transfer pockets 142a. The turret 52 can actively rotate in synchronic relationship with the turret 57 to assist in moving the transfer pockets 142a. This present embodiment is particularly useful in food processing machines 100c wherein the path taken by the transfer pockets 142a is relatively short.

Figure 4:
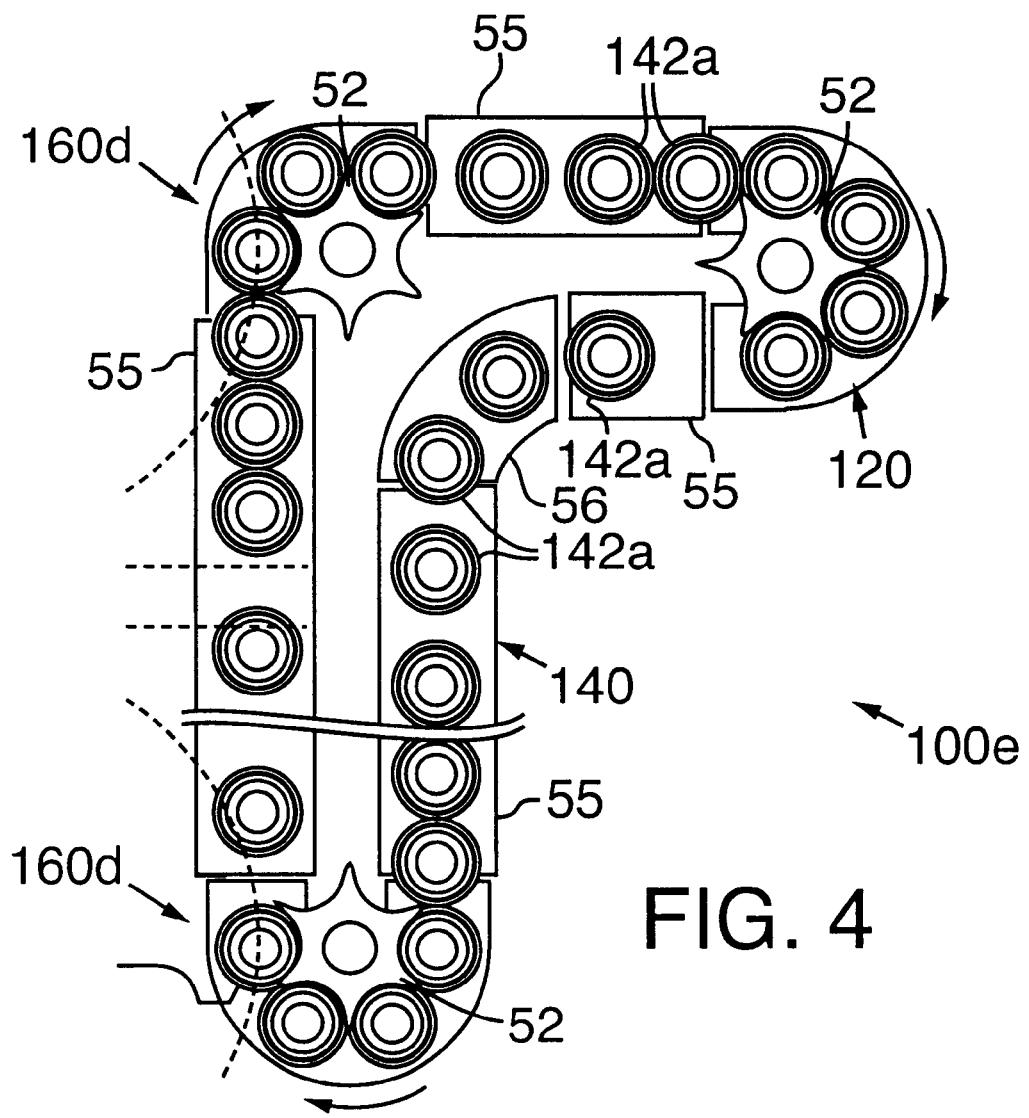
FIG. 4 is a view of another embodiment of the food processing machine in accordance with the invention.

FIG. 4 illustrates a food processing machine 100e in accordance with another embodiment of the invention. The transfer pockets 142a are processed by a plurality of container-handling machines 160d wherein the transfer pockets 142a are individually processed to receive food portions at one portioning machine 120. Neither the operation of the portioning machine 120 nor the container-handling machines 160d interfere with each other.

Additional embodiments are provided below. These are illustrative of specific embodiments and are not to be taken in a limiting sense, the scope of the invention being defined by the appended claims and their equivalents.

Figure 5:
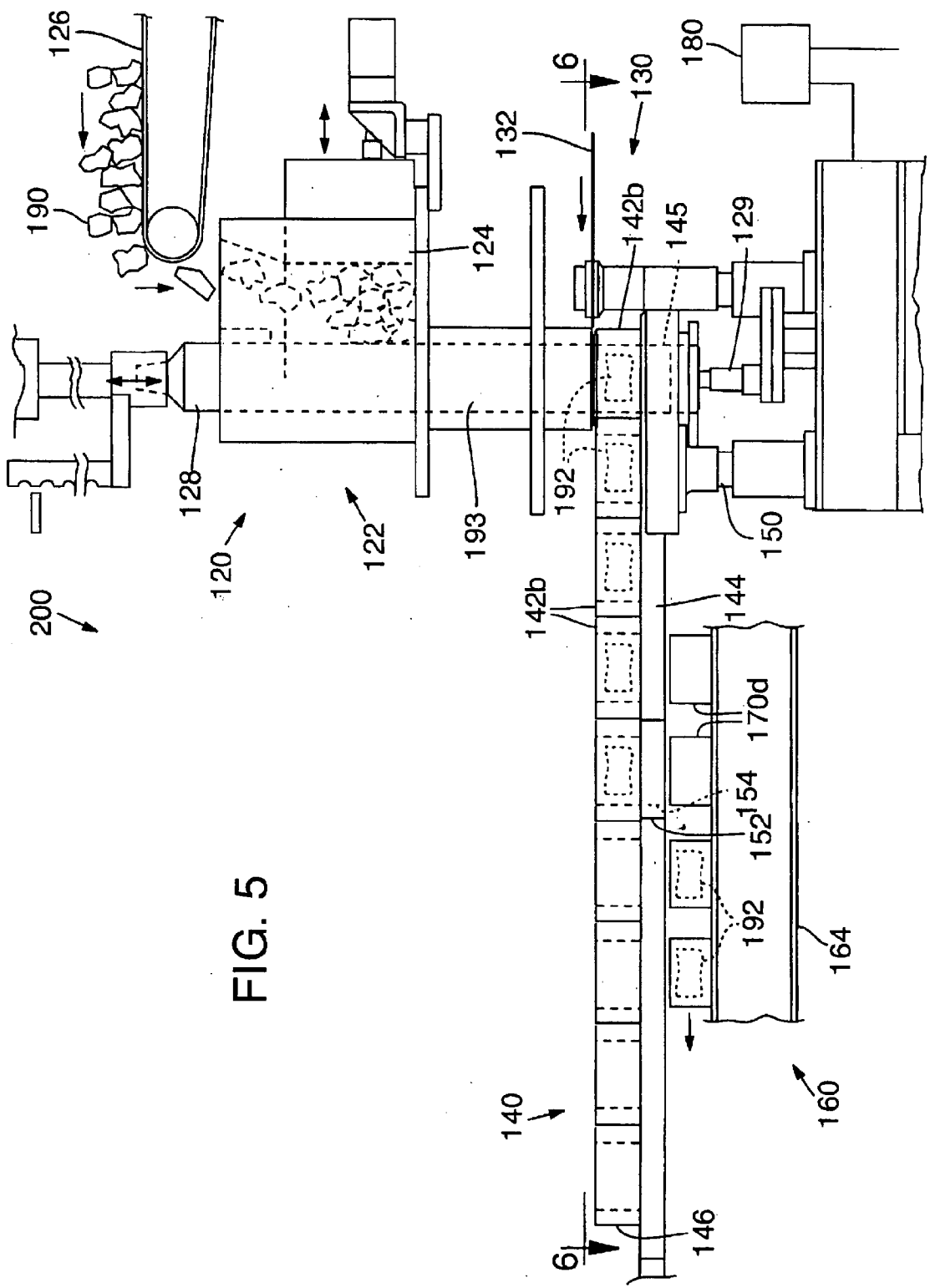
FIG. 5 is a view of another embodiment of the food processing machine in accordance with the invention.

FIG. 5 illustrates a food processing machine 200 in accordance with an embodiment of the invention. The machine 200 is based on a filling machine as identified in U.S. Pat. No. 5,570,562, Anderson, incorporated herein by reference. The machine 200 comprises a portioning machine 120, a transfer machine 140, and a container-handling machine 160. The machine 200 has a programmable operating control unit 180 to control the operation of the machine 200. The portioning machine 120 prepares food product 190 into a food portion 192 of a desired size, shape, weight, and consistency. The transfer machine 140 transports the food portion 192 between the portioning machine 120 and the container-handling machine 160. The container-handling machine 160 receives the food portion 192 from the transfer machine 140 for packaging the food portion 192 into a food container 170d.

The portioning machine 120 has a product sizing machine 122 for processing a bulk quantity of food product 190 and subsequently sizing the food product 190 into food portions 192. The sizing machine 122 has an expandable forming chamber 124 to receive a quantity of the food product 190. The chamber 124 is expanded to receive the food product 190 from an infeed conveyor 126 and is collapsed to form the food product 190 into a food product column 193. An upper plunger 128 and a lower plunger 129 in opposing relationship to each other act to compress the food product column 193. The degree of compaction of the food product 190 is determined to produce a food product 190 of a desired consistency.

The food product column 193 is presented to a slicing machine 130 that slices the food portion 192 from the food product column 193. The food portion 192 is subsequently presented to the transfer machine 140. The portioning machine 120 cooperates with the transfer machine 140 to place the food portion 192 into an open-ended transfer pocket 142b. The transfer pocket 142b is a topless and bottomless container which can be of any shape suitable for the particular purpose, such as, but not limited to, a box, cylinder, and octagon. The transfer pocket 142b in the embodiment of FIG. 5 is a topless and bottomless square cup that rides on a guide plate 144. The guide plate 144 acts as a bottom of the transfer pocket 142b. The transfer pocket 142b is positioned between the food product column 193 and the lower plunger 129. The guide plate 144 has a guide plate opening 145 to allow the lower plunger 129 to extend upwardly through the transfer pocket 142b to abut the food product column 193.

During the process of filling the transfer pocket 142b, the lower plunger 129 retracts as the upper plunger 128 extends to force the food product column 193 into the transfer pocket 142b. The lower plunger 129 operating in conjunction with the upper plunger 128 determines the size of the food portion 192 to be received in the transfer pocket 142b. The lower plunger 129 is arranged to enter the transfer pocket 142b a determined distance to establish the height of the food portion 192 to be received by the transfer pocket 142b.

The slicing machine 130 comprises a slicing blade 132 that severs the food portion 192 to be received in the transfer pocket 142b from the balance of the food product column 193.

FIG. 6 is a top view of the transfer machine 140 in accordance with the embodiment of FIG. 5 along view lines 6—6. The transfer pockets 142b are moved upon a transfer conveyor 150 comprising a guide plate 144. The transfer pockets 142b are supported by and travel on the guide plate 144 that in effect provides a bottom for the transfer pockets 142b as the transfer pockets 142b are moved from the portioning machine 120 to the container-handling machine 160. Any number of devices suitable for the intended purpose, such as conveyor belts and/or wall-mounted motorized rollers 148, can be utilized to impart forward movement to the transfer pockets 142b to move the transfer pockets 142b along the guide plate 144.

The food portion 192 is subsequently presented to the container-handling machine 160 by the transfer machine 140 as further shown in FIG. 7. The container-handling machine 160 comprises a container conveyor 164. The container conveyor 164 presents a plurality of food containers 170d individually to the transfer machine 140 such that the food container 170d may be filled.

The guide plate 144 has a slide plate 152 that is movable substantially transverse to the direction of travel of the transfer pockets 142b as indicated by arrow 153 in FIG. 6. The slide plate 152 has a slide plate opening 154 positioned strategic to the container conveyor 164 and is movable to position the slide plate opening 154 directly under the transfer pocket 142b from which the food portion 192 is to be dispensed into the food container 170d. The slide plate 152 is shown in FIG. 6 with the slide plate opening 154 out of the travel path of the transfer pocket 142b. The movement of the slide plate 152 is coordinated with the food container filling cycle of the machine 200. When the transfer pocket 142b containing the food portion 192 has been advanced to the container-handling machine 160, the slide plate 152 is moved by a known actuator to position the slide plate opening 154 under the transfer pocket 142b enabling the food portion 192 to be dispensed into the food container 170d from the transfer pocket 142b. The slide plate 152 movement is coordinated with the determined cycle of the machine 200 and in particular the dispensing of the food portion 192 from the transfer pocket 142b into the food container 170d. The food container 170d is presented on the container conveyor 164 as an open-ended container into which the food portion 192 may be deposited.

In applications wherein a larger quantity of food portion 192 is to be packaged into the food container 170d, the slide plate 152 may be controlled such that the transfer pocket 142b traverses the container-handling machine 160 without depositing the food portion 192. The transfer pocket 142b will return to the portioning machine 120 to receive a second food portion 192. This re-circulation of the transfer pocket 142b may take place any number of times until the desired quantity of food portion 192 is deposited into the transfer pocket 142b. Upon reaching the desired quantity of food portion 192, the slide plate 152 actuates to deposit the quantity of food portion 192 into the food container 170d.

Figure 8:
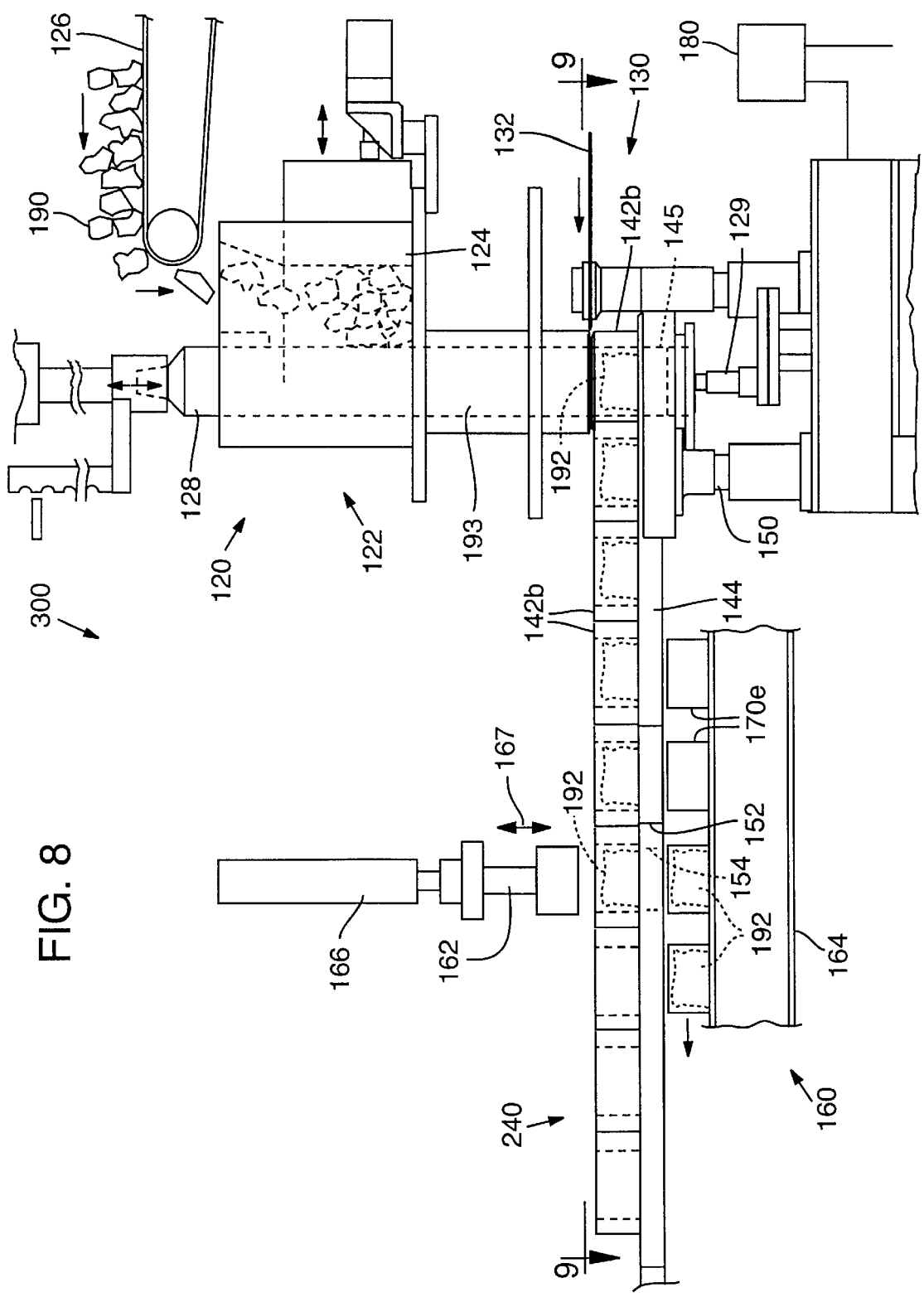
FIG. 8 is a view similar to FIG. 5 illustrating another embodiment of a food processing machine in accordance with the invention.

FIG. 8 illustrates another embodiment of a food processing machine 300 of the present invention. The machine 300 is arranged and operated in a similar manner as the machine 200 in FIGS. 5–7. The machine 300 comprises a portioning machine 120, a transfer machine 240, and a container-handling machine 160. The portioning machine 120 fills the transfer pockets 142b in similar fashion as described above.

The food portion 192 is presented to the container-handling machine 160 by the transfer machine 240 in similar fashion as shown in FIG. 7. The transfer machine 240 comprises a movable tamper plunger 162. The tamper plunger 162 is movable upwardly and downwardly by a cylinder 166 as indicated by arrow 167. The cylinder 166 is adapted to move the tamper plunger 162 downward into the transfer pocket 142b that is positioned below the tamper plunger 162 during the food container filling cycle.

The guide plate 144 has a slide plate 152 that is movable substantially transverse to the direction of travel of the transfer pocket 142b as indicated by arrow 153. The slide plate 152 has an slide plate opening 154 positioned strategic to the container conveyor 164 and is movable to position the slide plate opening 154 directly under the transfer pocket 142b from which the food portion 192 is to be dispensed into the food container 170e. The movement of the slide plate 152 is coordinated with the food container filling cycle of the machine 300. When the transfer pocket 142b containing the food portion 192 has been advanced to the container-handling machine 160, the slide plate 152 is moved by a known actuator to position the slide plate opening 154 under the transfer pocket 142b. The tamper plunger 162 moves downward into the transfer pocket 142b to assist in removing the food portion 192 from the transfer pocket 142b. The tamper plunger 162 pushes the food portion 192 free of the transfer pocket 142b allowing the food portion 192 to be deposited into the food container 170e. The slide plate 152 movement is coordinated with the determined cycle of the machine 300 and, in particular, the dispensing of the food portion 192 from the transfer pocket 142b by the tamping plunger 162 into the food container 170e.

Figure 9:
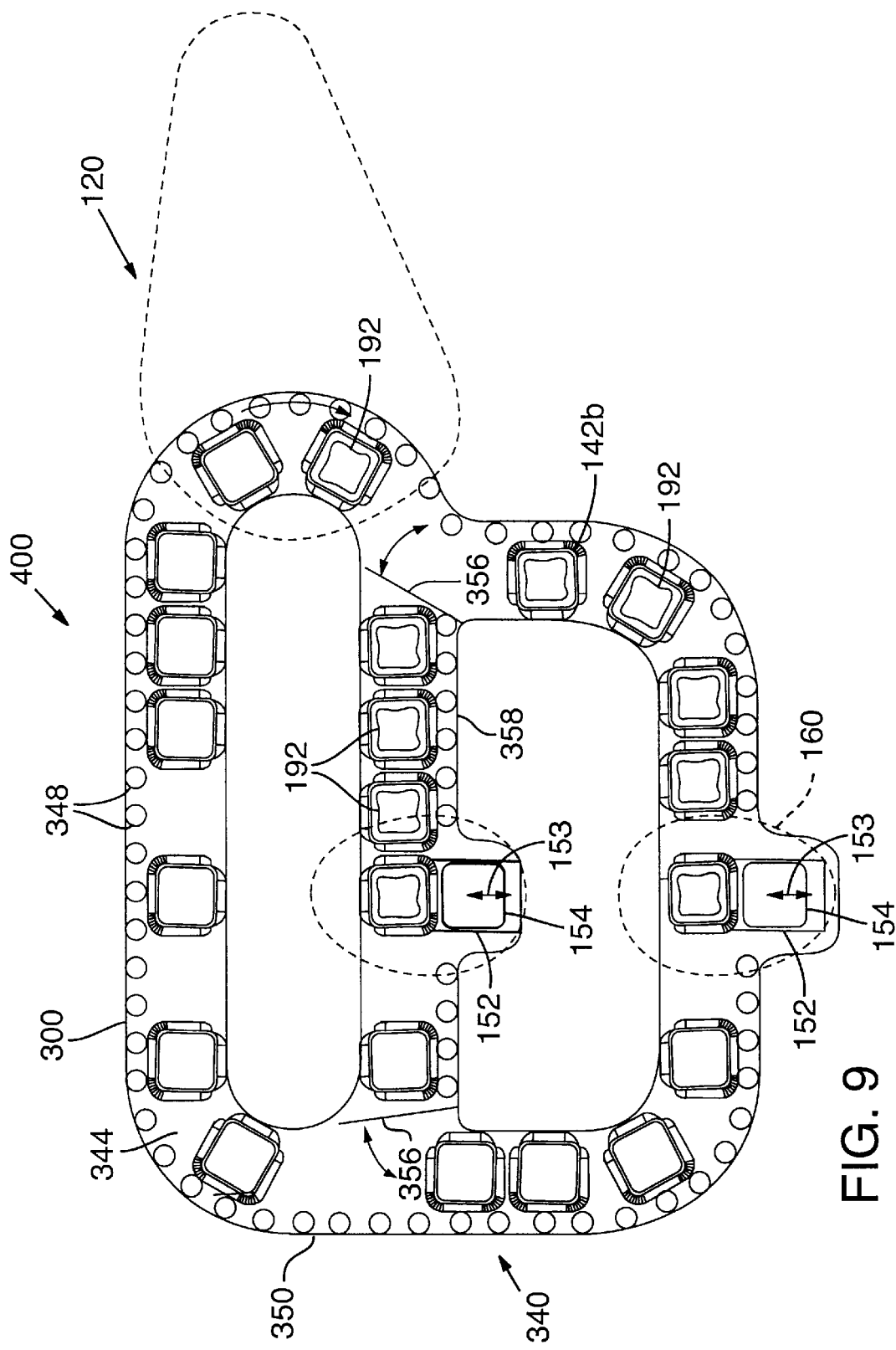
FIG. 9 is a view similar to FIG. 6 illustrating another embodiment of a food processing machine in accordance with the invention.
Figure 3A:
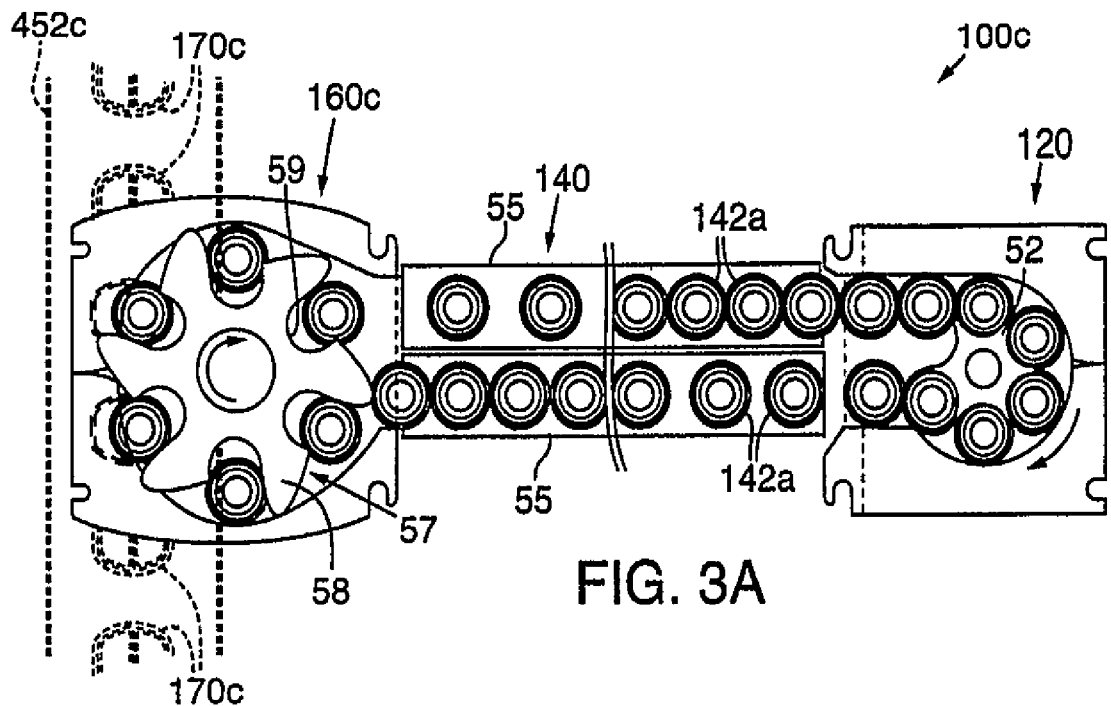
Figure 3B:
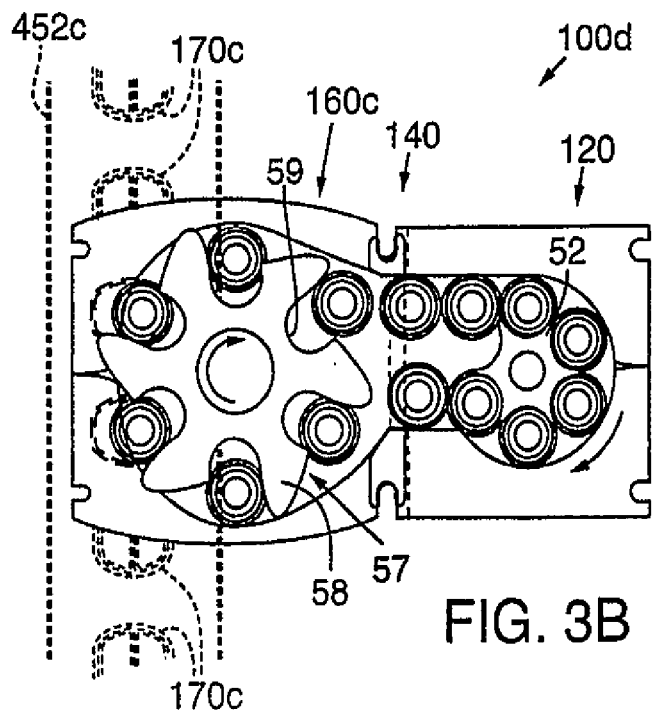

FIG. 9 illustrates another embodiment of the food processing machine 400 of the present invention. The machine 400 is arranged in a similar manner as the machine 200 in FIGS. 5–7. The machine 400 comprises a portioning machine 120, a transfer machine 340, and a container-handling machine 160. The transfer machine 340 comprises a plurality of individual open-ended transfer pockets 142b. The transfer pockets 142b are moved upon a transfer conveyor 350 comprising a guide plate 344. The transfer pockets 142b are supported by and travel on the guide plate 344 that in effect provides a bottom for the transfer pockets 142b as the transfer pockets 142b are moved from the portioning machine 120 to the container-handling machine 160. Any number of devices suitable for the intended purpose, such as conveyor belts and/or wall-mounted motorized rollers 348, as shown in FIG. 9, can be utilized to impart forward movement to the transfer pockets 142b to move the transfer pockets 142b along the guide plate 344.

The transfer pockets 142b are directed along multiple outflow paths 358 to enable the use of more than one container-handling machines 160. The transfer pockets 142*b* are metered through the multiple outflow paths 358 using flow control doors 356 and the like. Multiple outflow paths 358 are particularly beneficial when, for example, the speed of the portioning machines 120 loading the transfer pockets 142*b* is faster than the container-handling machine 160 receiving the food portion 192 from the transfer pockets 142*b*. Product throughput can thus be made more efficient as the speed of the components of the machine 400 is accommodated without effecting the speed of the other components.

It will be appreciated that other food processing machines using various combinations and multiples of portioning machines, transfer machines, and container-handling machines are within scope of the invention. In one embodiment, not shown, the machine 200 is arranged to fill two transfer pockets 142*b* simultaneously using two portioning machines 120.

Similarly, it will be appreciated that the number of transfer pockets 142*b* that are simultaneously emptied into a number of food containers 170*e* may be varied to suit the requirements. In one embodiment, not shown, the machine 300 comprises a plurality of tamping plungers 162 to simultaneously push a plurality of food portions into corresponding containers 170*e*. In another embodiment, not shown, the machine 200 comprises a plurality of slide plates 152 to enable the transfer of multiple food portions 192 into multiple food containers 170*e*.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the food processing industry will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A food transfer machine for conveying food portions from a portioning machine that prepares the food portions to a container handling machine that prepares containers to receive the food portions, comprising:

a plurality of transfer pockets and a conveyor, the conveyor adapted to convey each transfer pocket independently from another from the portioning machine to the container handling machine, the transfer machine arranged to present one or more transfer pockets to the food portioning machine to collect food portions, and the transfer machine arranged to present one or more transfer pockets containing food portions to the container handling machine for subsequent depositing of the food portions into food containers.

2. The food transfer machine as defined in claim 1 wherein the operation of the container handling machine is independent from the operation of the portioning machine.

3. The food transfer machine as defined in claim 1 wherein each transfer pocket comprises an open-ended container, the conveyor comprising a guide for supporting the transfer pockets and serving as a bottom for the transfer pockets such that the food portions are contained within the transfer pockets.

4. The food transfer machine as defined in claim 3, wherein the guide comprises one or more slide plates mounted thereto, each slide plate having an opening therein sized to allow the food portion from the transfer pocket to pass through, each slide plate movable to position the opening into and out of the travel path of the transfer pockets, the transfer machine moving the transfer pockets independently along the guide to the one or more slide plates, each slide plate controlled to drop the food portion contained in the transfer pocket though the opening to be deposited into the food container held below the opening.

5. The food transfer machine as defined in claim 3, wherein the guide comprises one or more slide plates mounted thereto, each slide plate having an opening therein sized to allow the food portion from the transfer pocket to pass through, each slide plate movable to position the opening into and out of the travel path of the transfer pockets, the transfer machine moving the transfer pockets independently along the guide to one of the one or more slide plates, each slide plate controlled to drop the food portion contained in the transfer pocket though the opening to be deposited into the food container held below the opening.

6. The food transfer machine as defined in claim 1 wherein the conveyor comprises a closed circuit to convey the transfer pockets in an endless loop between the portioning machine and the container handling machine.

7. The food transfer machine as defined in claim 1 wherein the conveyor comprises a closed circuit to convey the transfer pockets in an endless loop between the portioning machine and the container handling machine, the conveyor comprising multiple conveyance lanes between the portioning machine and the container handling machine such that multiple container handling machines can operate in parallel relationship.

8. The food transfer machine as defined in claim 1 wherein the conveyor comprises a closed circuit to convey the transfer pockets in an endless loop between the portioning machine and the container handling machine, the conveyor comprising multiple conveyance lanes between the container handling machine and the portioning machine such that multiple portioning machines can operate in parallel relationship.

9. The food transfer machine as defined in claim 1 wherein the conveyor comprises one or more drive turrets, the drive turrets comprising a plurality of spaced-apart teeth, wherein as the drive turrets rotate in a desired direction, the transfer pockets are entrained between the teeth and are urged in forward movement.

10. The food transfer machine as defined in claim 1 wherein the conveyor comprises two oppositely rotating belts, wherein the transfer pockets are carried in one direction by one belt and subsequently carried in the opposite direction by the other belt, the two belts in continuous movement imparting forward mobility to the transfer pockets, the belts moving freely beneath transfer pockets that are held stationary.

11. A food processing machine for producing food portions and depositing each food portion into a food container, comprising:

a portioning machine for producing food portions;

a container handling machine for positioning open-ended food containers to receive the food portion; and a transfer machine comprising a plurality of open-ended transfer pockets, the transfer machine adapted to transfer one food portion in one transfer pocket, each transfer pocket conveyed independently from another from the portioning machine to the container handling machine, the transfer machine arranged to present the filled transfer pockets to the container handling machine for subsequent depositing of the food portion into the food container, the operation of the container handling machine being independent from the operation of the portioning machine.

12. The food processing machine as defined in claim 11, wherein the transfer machine presents the filled transfer pockets individually to the container handling machine.

13. The food processing machine as defined in claim 11, wherein the transfer machine presents two or more filled transfer pockets to the container handling machine for simultaneous depositing of the food portions into corresponding food containers.

14. The food processing machine as defined in claim 11, further comprising:
 a plurality of container handling machines, wherein the transfer machine conveys the filled transfer pockets to the plurality of container handling machines.

15. The food processing machine as defined in claim 11, wherein each transfer pocket comprises a container having a closed side wall and open ends, and the transfer machine further comprising a guide for supporting the transfer pockets and serving as a bottom for the transfer pockets, the guide having a slide plate mounted thereto, the slide plate having an opening therein sized to allow the food portion to pass through, the slide plate being movable to position the opening into and out of the travel path of the transfer pockets, the slide plate controlled to drop the food portion contained in each transfer pocket though the opening to be deposited into the food container held below the opening.

16. The food processing machine as defined in claim 15, the transfer machine further comprising a conveyor for moving the transfer pockets independently along the guide and to direct the transfer pockets to the container handling machine, wherein the conveyor comprises a series of rollers positioned strategic to the transfer pockets to urge the transfer pockets to move along the guide.

17. The food processing machine as defined in claim 16, wherein the transfer machine further comprises a tamper plunger for pushing the food portion out of the transfer pocket and through the slide plate opening.

18. The food processing machine as defined in claim 11, wherein each transfer pocket comprises a container having a closed side wall and open ends, and the transfer machine further comprising:
 a guide for supporting the transfer pockets and serving as a bottom for the transfer pockets, the guide having a plurality of slide plates mounted thereto, the slide plates having an opening therein sized to allow the food portion to pass through, the slide plates being movable to position the opening into and out of the travel path of the transfer pockets; and
 a conveyor for moving the transfer pockets independently along the guide and to convey the transfer pockets to one of the plurality of slide plates, each slide plate controlled to drop the food portion contained in the transfer pocket though the opening to be deposited into the food container held below the opening.

19. The food processing machine as defined in claim 11, wherein each transfer pocket comprises a container having a closed side wall and open ends, the transfer machine further comprising:
 guide for supporting the transfer pockets and serving as a bottom for the transfer pockets, the guide having a slide plate mounted thereto, the slide plate having an opening therein sized to allow the food portion to pass through, the slide plate being movable to position the opening into and out of the travel path of the transfer pockets; and
 a conveyor for moving the transfer pockets along the guide directing the pockets in a circuit from the portioning machine to the container handling machine and back to the portioning machine, the slide plate controlled to either drop the food portion contained in the transfer pocket though the opening to be deposited into the food container held below the opening, or to allow the transfer pocket and food portion to return to the portioning machine such that a second food portion is deposited into the transfer pocket, the slide plated controlled to allow a determined number of food portions to be received into the transfer pocket before releasing the food portions into the food container.

20. The food processing machine as defined in claim 11 wherein the conveyor comprises one or more drive turrets, the drive turrets comprising a plurality of spaced-apart teeth, wherein as the drive turrets rotate in a desired direction, the transfer pockets are entrained between the teeth and are urged in forward movement.

21. The food processing machine as defined in claim 11 wherein the conveyor comprises two oppositely rotating belts, wherein the transfer pockets are carried in one direction by one belt and subsequently carried in the opposite direction by the other belt, the two belts in continuous movement imparting forward mobility to the transfer pockets, the belts moving freely beneath transfer pockets that are held stationary.

* * * * *

UNITED STATES PATENT AND TRADEMARK OFFICE
CERTIFICATE OF CORRECTION

PATENT NO. : 6,711,877 B2
APPLICATION NO. : 10/067612
DATED : March 30, 2004
INVENTOR(S) : Robert A. Zschoche It is certified that error appears in the above-identified patent and that said Letters Patent is hereby corrected as shown below:

Delete drawing sheet 5 consisting of figures 3A and 3B, and substitute therefor, drawing sheet 5 consisting of figures 3A and 3B (attached)

Col. 1, line 50, "...failure because of there multi-part..." should read --...failure because of their multi-part...--;
Col. 1, line 58, "...machine does not effect..." should read --...machine does not affect...--;

Col. 7, line 6, "...containers 107a" should read --...containers 170a...--;
Col. 7, line 45, "...transfer pockets 142" should read --...transfer pockets 142a...--;
Col. 7, line 56, "...container. 170c..." should read --...container 170c...--;
Col. 10, line 2, "...re-circulation..." should read --...recirculation...--;
Col. 10, line 28, "...an slide plate..." should read --...a slide plate...--;
Col. 10, line 46-47, "...tamping plunger 162..." should read --...tamper plunger 162...--;
Col. 11, line 10, "effecting" should read --...affecting...--;

In the Claims:
Col. 11, line 23, "...tamping plumber 162..." should read --...tamper plunger 162...--;
Col. 12, line 8, "...though the opening..." should read --...through the opening...--;
Col. 12, line 19, "...though the opening..." should read --...through the opening...--;
Col. 13, line 29, "...though the opening..." should read --...through the opening...--;
Col. 14, line 8, "...though the opening..." should read --...through the opening...--;
Col. 14, line 26, "...though the opening..." should read --...through the opening...--.

Signed and Sealed this

Twentieth Day of March, 2007

JON W. DUDAS
*Director of the United States Patent and Trademark Office*